United States Patent [19]

Schlapper

[11] 4,237,991
[45] Dec. 9, 1980

[54] SELF-PROPELLED LAWN MOWER

[75] Inventor: Eugene H. Schlapper, Libertyville, Ill.

[73] Assignee: Outboard Marine Corporation, Waukegan, Ill.

[21] Appl. No.: 967,610

[22] Filed: Dec. 8, 1978

Related U.S. Application Data

[63] Continuation-in-part of Ser. No. 872,638, Jan. 26, 1978, abandoned.

[51] Int. Cl.³ .............................................. B60K 23/00
[52] U.S. Cl. ........................................ 180/74; 56/11.1
[58] Field of Search .................... 180/74, 19 R, 70 R; 56/11.1; 74/190, 352

[56] References Cited

U.S. PATENT DOCUMENTS

| 2,631,458 | 3/1953 | Metzner | 74/190 |
| 2,947,132 | 8/1960 | Shaw | 180/74 X |
| 2,962,854 | 12/1960 | Jepson | 56/11.1 |
| 4,081,048 | 3/1978 | Hendricks | 180/74 X |

Primary Examiner—John J. Love
Assistant Examiner—Michael Mar

Attorney, Agent, or Firm—Michael, Best & Friedrich

[57] ABSTRACT

A self-propelled rotary lawn mower including a multi-speed transmission comprising a drive shaft which is driven by a prime mover and is rotatably mounted on a mower frame in parallel relationship to the rear wheel axle. Also included is a drive mounted on at least one end portion of the drive shaft for selectively engaging the outer periphery of one of the mower rear wheels which serves as a drive wheel. The drive includes a first or low-speed drive member which is affixed on the drive shaft and has a first drive surface and a second or high-speed drive member which has a second drive surface larger in diameter than the first drive surface. The high-speed drive member is mounted on the drive shaft for relative axial movement between a first or low-speed position wherein the high-speed drive member is axially spaced from the drive wheel and the drive surface of the low-speed drive member is exposed for engagement with the outer periphery of the drive wheel and a second or high-speed position wherein the drive surface of the high-speed drive member is located for engagement with the outer periphery of the drive wheel.

6 Claims, 6 Drawing Figures

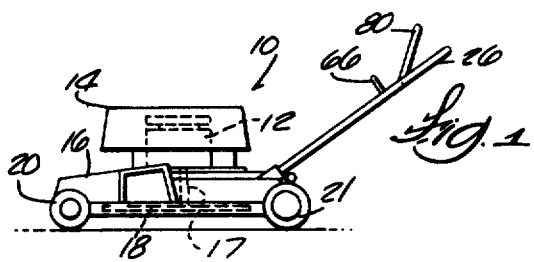
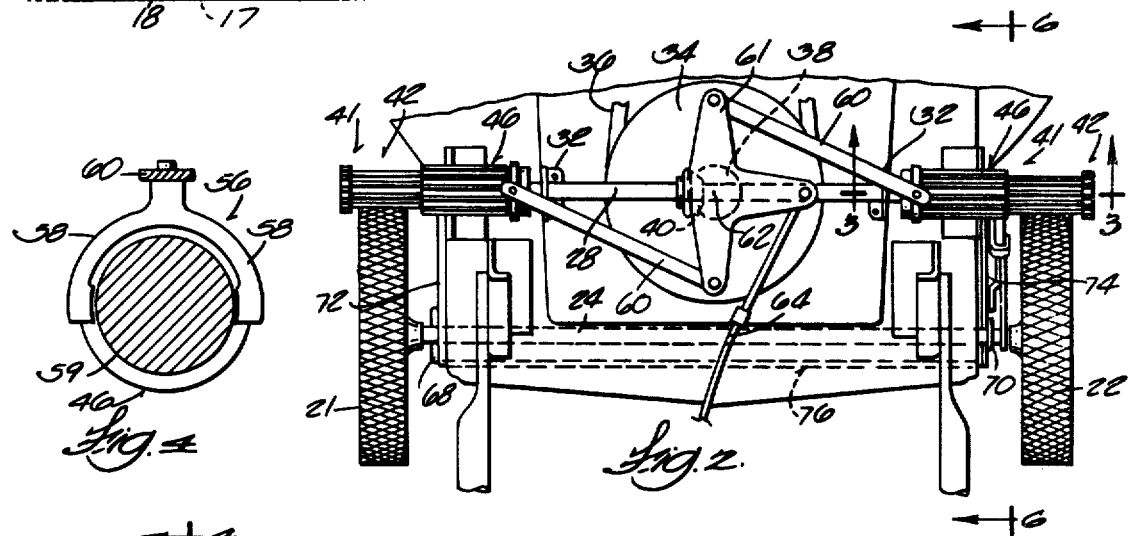
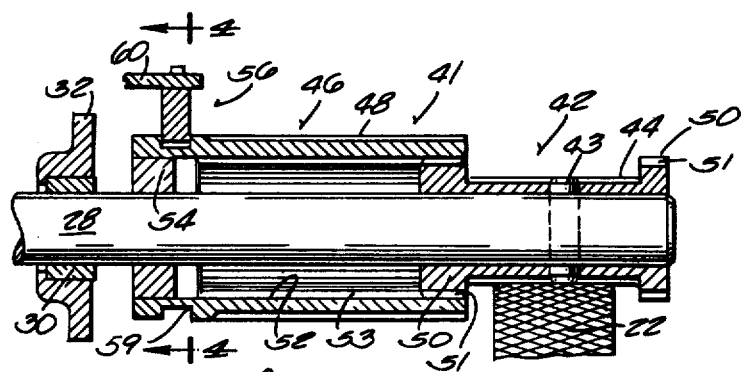
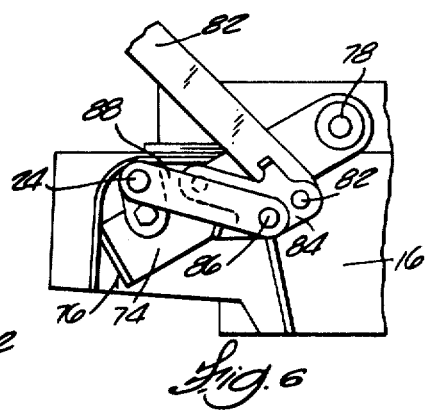
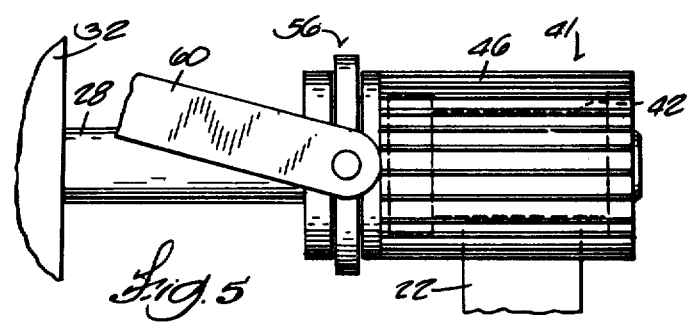

SELF-PROPELLED LAWN MOWER

This application is a continuation-in-part of a Ser. No. 872,638 filed Jan. 26, 1978, now abandoned.

BACKGROUND OF THE INVENTION

This invention relates to self-propelled lawn mowers and particularly to rotary lawn mowers of either the riding type or the walk-behind type.

Self-propelled rotary lawn mowers typically are driven by a transmission connected to the cutter blade drive shaft. Consequently, for mowers powered by an internal combustion engine, the mower speed can be varied only by adjustment of the engine throttle. In some situations, such as cutting heavy weeds or grass or mulching leaves, high cutter blade speed and lower mower travel speed may be desired. If the engine speed is reduced to accomplish the desired slower mower speed, the blade speed is reduced and, in some cases, the reduced power of the engine at the lower speed may be insufficient to accomplish the desired cutting. In other situations, it may be desired to operate the mower at high blade and mower speeds, low blade and mower speeds, or low blade speed and high mower speed.

U.S. Pat. No. 2,947,132,—Shaw issued Aug. 2, 1960, discloses a transmission for a rotary mower of the walk behind type, which mower includes a drive shaft which is drivingly connected to a prime mover and is selectively movable into frictional engagement with the outer periphery of a pair of the mower wheels to drive the mower. The present invention is directed to an improvement whereby the mower speed can be selectively varied independently of the engine speed.

The U.S. Pat. No. 2,962,854,—Jepson—issued Dec. 6, 1960, also discloses a rotary mower of the walk-behind type including a transmission having a two-speed drive gear with concentric rings of gear teeth and a driven gear which is connected to wheel-engagable drive shaft and which can be moved axially to mesh with either of the drive gear rings for varying the mower speed.

The U.S. Pat. No. 4,081,048—Hendricks discloses a friction drive primarily for a bicycle vehicle.

The U.S. Pat. No. 2,631,458—Metzner—discloses a speed change mechanism for phonograph turntables.

SUMMARY OF THE INVENTION

The invention provides a self-propelled rotary lawn mower which can be of either the riding type or the walk-behind type and which comprises a frame supported on a plurality of wheels for movement over the ground, at least one of which is adapted to serve as a drive wheel, a prime mover supported on the frame, a cutter blade drivingly connected to the prime mover and mounted within a housing for rotation relative to the frame, a drive shaft rotatably mounted on the frame in parallel relationship to the drive wheel axis, means drivingly connecting the prime mover to the drive shaft, and drive means on the drive shaft for selectively driving the drive wheel at two different speeds. The drive means includes a first or low-speed drive member mounted on the drive shaft for common rotation therewith and having a first generally circular drive surface for frictionally engaging the outer periphery of the drive wheel and a second or high-speed drive member including a second generally circular drive surface having an outer diameter greater than the outer diameter of the drive surface on the low-speed drive member. The high-speed or second drive member is mounted on the drive shaft for common rotation therewith and for axial movement relative to the low-speed drive member between a low-speed position wherein the high-speed drive member is axially spaced from the drive wheel and the drive surface on the low-speed drive member is exposed for engagement with the outer periphery of the drive wheel, and a high-speed position wherein the drive surface on the high-speed drive member is axially located for engagement with the outer periphery of the drive wheel. The drive means further includes shift means operably connected to the second drive member for selectively moving the second drive member between the low-speed and high-speed positions, and means for moving the drive shaft and the drive wheel relative to each other between a drive position wherein either the low-speed or the high-speed drive member is in driving engagement with the drive wheel and a non-driving position wherein both of the drive members are disengaged from the drive wheel.

In one embodiment, the mower includes a pair of co-axially mounted wheels and individual drive means are provided on each of the opposite end portions of the drive shaft for driving each of these wheels.

In one embodiment, the shift means includes a movable control lever on the mower guiding handle, shift members movable axially of the drive shaft and operably connected to the high-speed drive member(s) for affecting axial movement of the high-speed member(s) relative to the low-speed drive member(s) in response to axial movement of the shift members, and means connecting the control lever to the shift members for affecting axial movement of the shift members in response to movement of the control lever.

In one embodiment, the low-speed drive member includes a pair of radially outwardly extending, annular shoulders disposed adjacent the opposite ends of the low-speed drive surface, each shoulder having a plurality of circumferentially-spaced, axially extending external splines, and the high-speed drive member includes a central bore having a plurality of circumferentially-spaced, axially extending internal splines for receiving the splined shoulders on the low-speed drive member.

One of the principal features of the invention is the provision of a self-propelled rotary lawn mower including a multi-speed transmission.

Another of the principal features of the invention is the provision of such a transmission which is capable of selectively changing the mower speed independently of the speed of the mower prime mover.

A further of the principal features of the invention is the provision of a self-propelled rotary lawn mower including a drive mechanism which is arranged to selectively driveingly engage the outer periphery of one or more of the mower wheels and which includes selectively operable drive members of different size for propelling the drive wheel, and thus the mower, at different speeds.

Other features and advantages of the embodiments of the invention will become apparent to those skilled in the art upon reviewing the following detailed description, the drawings and the appended claims.

BREIF DESCRIPTION OF THE DRAWINGS

FIG. 1 is a side elevational view of a self-propelled lawn mower embodying various of the features of the invention.

FIG. 2 is an enlarged, fragmentary, top plan view of the mower in FIG. 1 with the drive means shown in the low-speed position.

FIG. 3 is a sectional view taken generally along line 3—3 in FIG. 2.

FIG. 4 is a sectional view taken generally along line 4—4 in FIG. 3.

FIG. 5 is an enlarged fragmentary top view of the righthand portion of the mower in FIG. 3 with the drive means shown in the high-speed position.

Before explaining at least one embodiment of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

DESCRIPTION OF THE PREFERRED EMBODIMENTS

Illustrated in the drawing is a self-propelled rotary lawn mower 10 of the walk-behind type. However, the invention also extends to riding mowers. The member 10 includes a prime mover 12, such as an internal combustion engine or an electric motor, partially covered by a shroud 14 and supported on a frame including a blade housing 16. Drivingly connected to the prime mover 12 is an engine drive shaft 17 which drives a rotary cutter blade 18 located inside the blade housing 16. The mower 10 is supported for travel along the ground by a pair of front wheels 20 (one shown) and a pair of rear wheels 21 and 22 carried on one or more axles 24 rotatably supported rearwardly of the blade housing 16 as described in more detail below. The mower 10 is guided by a handle 26 connected to and extending rearwardly from the blade housing 16.

The mower 10 is powered by a drive mechanism or transmission which is operable to selectively connect the prime mover 12 in driving engagement with at least one of the wheels. In the specific construction illustrated, the transmission is generally arranged in the manner disclosed in the above-identified United States Shaw patent. More specifically, the transmission includes (FIGS. 2 and 3) a drive shaft 28 disposed in parallel relationship to the rear axle 24 and rotatably supported in bearings 30 (one shown in FIG. 3) carried by fixed support brackets 32. The drive shaft 28 is drivingly connected to the prime mover 12 by a suitable drive arrangement, such as a pulley 34 driven by the engine drive shaft 17 via a belt 36 and a beveled gear 38 on the pulley 34 meshing with and driving a beveled gear 40 fixedly mounted on the drive shaft 28.

Located on at least one end portion of the drive shaft 28 is a drive means 41 for selectively engaging the outer periphery of the respective rear wheel and driving the mower 10 at two different speeds. In the specific construction illustrated, a drive means 41 is provided on each of the opposite end portions of the drive shaft 28; however, a drive means 41 on only one end portion of the drive shaft 28 may be adequate in some applications. In that case, the rear wheels 21 and 22 preferably are fixedly mounted on the axle 24 so that rotation of one wheel acting as the drive wheel also rotates the other wheel, thereby maximizing traction.

The drive means 41 (FIG. 3) includes a first or low-speed drive member 42 fixedly mounted, by a drive pin 43 or the like, on the drive shaft 28 for common rotation therewith. The low-speed drive member 42 has a first generally circular drive surface 44 for frictionally engaging the outer peripheral surface of the rear wheel 22 and driving the wheel in response to rotation of the drive shaft 28. The drive means 41 further includes a second or high-speed drive member 46 having a second generally circular drive surface 48 which has an outer diameter greater than the outer diameter of the first drive surface 44.

The high-speed drive member 46 is mounted for common rotation with the drive shaft 28 and for axial movement relative to the low-speed drive member 42 between a first or low-speed position shown in FIG. 3 wherein the second drive member 46 is axially spaced from the wheel 22 and the first drive surface 44 of the low-speed drive member is exposed for engagement with the outer periphery of the wheel and a second or high-speed position shown in FIG. 5 wherein the second drive surface 48 is located for engagement with the outer periphery of the wheel. The first and second driving surfaces 44 and 48 are serrated, knurled or otherwise roughened to enhance the traction of the drive members 42 and 46 with the wheels 21 and 22.

Provided on the low-speed drive member 42 adjacent the opposite ends of the first drive surface 44 are a pair of radially extending annular shoulders 50 which have an outside diameter somewhat greater than the outside diameter of the first drive surface 44 and a plurality of circumferentially-spaced, axially extending external splines 51. The high-speed drive member 46 has a central bore 52 including a plurality of circumferentially-spaced, axially extending internal splines 53 which mesh with the external splines 51 on the shoulders 50 and permit axial movement of the high-speed drive member 46 relative to the low-speed drive member 42 while providing common rotation of the low-speed and the high-speed drive members 42 and 46. The inner end of the high-speed drive member 46 is supported by a pressed-in bushing 54 slidably and rotatably mounted on the drive shaft 28. Thus, the drive members 42 and 46 are rotating any time the prime mover 12 is operating.

Shift means are provided for moving the high-speed drive member 46 between the high-speed and the low-speed positions. While various arrangements can be used, in the specific construction illustrated, such means (FIGS. 3 and 4) includes a pair of shift members or yokes 56, each having a pair of diametrically opposed arms or legs 58 which are slidably received in an annular guideway 59 provided in the inner end portion of the high-speed drive member 46. Each yoke 56 is pivotally connected to a lever 60 which is pivotally connected to a rocker arm 61. The rocker arm 61 pivots at 62 and is operatively connected, via a push-pull element 64 or the like, to a control lever 66 mounted on the mower handle 26 for oscillatory movement. Oscillatory movement of the control lever 66 causes axial movement of the high-speed drive members 46, via the push-pull element 64, the rocker arm 61, the levers 60, and the yokes 56, betweeen the high and low-speed positions and the guideway 59 permits rotary movement of the high-speed drive member 46 relative to the yoke 56.

Means are provided for moving the drive shaft 28 and the rear wheels 22 relative to each other between a drive position wherein either the high-speed drive members 46 or the low-speed drive members 42 (depending on the position of the control lever 66) frictionally engages the outer periphery of the rear wheels 21 and 22 and a non-driving position wherein neither of the drive members are engaged with the rear wheels. While various arrangements can be used, in the specific construction illustrated, such means is generally arranged in the manner disclosed in the above U.S. Pat. No. 2,947,132—Shaw. The construction and operation of the means for moving the drive shaft 28 and the rear wheels 22 relative to each other will be briefly summarized and reference can be made to the Shaw patent for a more detailed description.

The rear wheels 22 are rotatable relative to the rear axle 24 which is carried by links or levers 68 and 70 pivotally mounted on arms 72 and 74 of a yoke 76. The yoke arms 72 and 74 are suitably supported from the blade housing 16 at 78 for pivotal movement relative to the blade housing 16. The levers 68 and 70 project upwardly from the yoke to accommodate fore and aft movement of the axle 24 and the rear wheels 21 and 22 relative to the drive shaft 28 for respectively engaging the rear wheels with the driving surfaces on the drive shaft 28 and disengaging the rear wheels 21 and 22 from the driving surfaces on the drive shaft 28. A tension spring (not shown) connected between the lever 68 and the yoke arm 72 urges the rear wheels 21 and 22 toward the disengaged position.

Movement of the rear wheels 22 between the drive or engaged position and the non-driving or disengaged position is effected by a control handle 80 mounted on the mower handle 26 for oscillatory movement and an actuator link 82. The actuator link 82 is operatively connected at the upper end to the control handle 80 and is connected at the lower end to the wheel axle 24 through a linkage arrangement including a lever 84 pivotally connected to the actuator link 82 and pivotally connected at 86 to another lever 88 which is pivotally mounted on the wheel axle 24.

When the control handle 80 is moved to the drive position (i.e., to the forward position shown in FIG. 1), the actuator link 82 is moved downwardly and moves the linkage arrangement to the position shown in FIG. 5 wherein the axle 24 is advanced to engage the wheels 22 with whichever of the drive members 42 and 46 is in the driving position. When the control handle 80 is moved to a neutral or non-driving position (i.e., moved rearwardly from the position shown in FIG. 1), the actuator link 82 is moved upwardly and moves the linkage arrangement to a position wherein the wheel axle 24 is retracted to disengage the rear wheels 21 and 22 from the drive members 42 and 46.

While the invention has been described in connection with a rotary lawn mower of the walk-behind type, it can be readily adapted for use on rotary lawn mowers of the riding type. The invention is also applicable reel-type lawn mowers.

Various of the features of the invention are set forth in the following claims:

What is claimed is:

1. A self-propelled rotary lawn mower comprising a frame supported on a plurality of wheels for movement over the ground, at least one of said wheels being adapted to serve as a drive wheel, a prime mover supported on said frame, a cutter blade drivingly connected to said prime mover and mounted within a housing for rotation relative to said frame, a drive shaft mounted on said frame for rotation relative to said frame and disposed in parallel relationship to the axis of said drive wheel, means drivingly connecting said prime mover to said drive shaft, drive means on said drive shaft for selectively driving said drive wheel at two different speeds including a first drive member mounted on said drive shaft for common rotation therewith and including a first generally circular drive surface for frictionally engaging the outer periphery of said drive wheel, and a pair of radially outwardly extending, axially-spaced annular shoulders disposed adjacent the opposite ends of said first drive surface and having a diameter greater than the diameter of said first drive surface, each of said shoulders having a plurality of circumferentially-spaced, axially-extending splines, a second drive member including a second generally circular drive surface having a diameter greater than the diameter of said first drive surface, said second drive member also including a central bore receiving said annular shoulders and having a plurality of circumferentially-spaced, axially extending internal splines receiving said shoulder splines, whereby said second drive member is mounted on said drive shaft for common rotation therewith and for axial movement relative to said first drive member between a first position wherein said second drive member is axially spaced from said drive wheel and said first drive surface is exposed for engagement with the outer periphery of said drive wheel and a second position axially spaced from said first position wherein said second drive surface is located for engagement with the outer periphery of said drive wheel, a shift member movable axially of said drive shaft and operably connected to said second drive member for relative rotation therebetween and for moving said second drive member axially of said drive shaft relative to said first drive member between the first and second positions in response to shift member movement axially of said drive shaft, and means for moving said drive shaft and said drive wheel relative to each other between a drive position wherein one of said first and second drive members is in driving engagement with said drive wheel and a non-driving position wherein said first and second drive members are disengaged from said drive wheel.

2. A self-propelled lawn mower according to claim 1 wherein a pair of said wheels are mounted on a common axle and are adapted to serve as drive wheels, and said mower includes a separate drive means for each of said two wheels.

3. A self-propelled lawn mower according to claim 1 wherein said drive shaft is mounted on said frame for rotation about a fixed axis and said drive wheel is mounted for movement of the axis thereof toward and away from said driveshaft.

4. A lawn mower according to claim 2 wherein said lawn mower includes a guiding handle connected to said frame, a movable control lever on said guiding handle, and means connecting said control lever on said guiding handle, and means connecting said control lever to said shift member for effecting axial movement of said shift member, and thus movement of said second drive member between the first and second positions in response to movement of said control lever.

5. A self-propelled lawn mower comprising a frame, a pair of wheels mounted on said frame for rotation about a common axis and supporting said frame for movement of the mower along the ground, a prime mover supported on said frame, a cutter blade drivingly connected to said prime mover and mounted within a housing for rotation relative to said frame, a drive shaft mounted on said frame for rotation about a fixed axis disposed in parallel relationship to the axis of said wheels, said drive shaft having opposite end portions respectively located in the vicinity of the outer periphery of said wheels, means drivingly connecting said prime mover to said drive shaft, drive means on said drive shaft for selectively driving each of said wheels at two different speeds including a pair of first drive members respectively mounted on said end portions of said drive shaft for common rotation therewith and each including a first generally circular drive surface for frictionally engaging the outer periphery of a respective one of said wheels and a pair of radially outwardly extending, axially-spaced annular shoulders disposed adjacent the opposite ends of said first drive surface, and having a diameter greater than the diameter of said first drive surface, each of said shoulders having a plurality of circumferentially-spaced, axially-extending external splines, a pair of second drive members each including a second generally circular drive surface having an outer diameter greater than the diameter of said first drive surface and said second drive member also including a central bore receiving said annular shoulders and having a plurality of circumferentially-spaced, axially extending internal splines receiving said shoulder splines, whereby said second drive members are mounted on respective end portions of said drive shaft for common rotation therewith and for axial movement relative to a respective one of said first drive members between a first position wherein said second drive members are axially spaced from said wheels and said first drive surfaces are exposed for engagement with the outer periphery of said wheels and a second position wherein said second drive surfaces are located for engagement with the outer periphery of said wheels, respective shift members movable axially of said drive shaft and operably connected to each of said second drive members for relative rotation therebetween and for simultaneously moving said second drive members axially of said drive shaft relative the respective first drive members between the first and second positions in response to shift member movement axially of said drive shaft, and means for moving said drive wheels relative to said drive shaft between a drive position wherein said drive wheels are in driving engagement with one of said first and second drive surfaces and a non-driving position wherein said wheels are disengaged from said first and second drive surfaces.

6. A self-propelled lawn mower according to claim 5 wherein said lawn mower ncludes a guiding handle connected to said frame, and further including a movable control lever on said guiding handle, and means connecting said control lever to said shift members for effecting axial movement of said shift members, and thus movement of said second drive members between the first and second positions in response to movement of said control lever.

* * * * *